Figure 1:
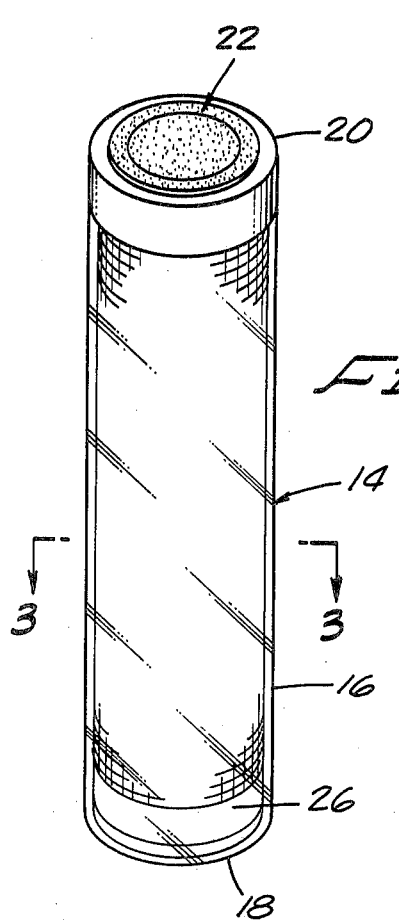

United States Patent [19]

Hall et al.

[11] 4,392,872
[45] Jul. 12, 1983

[54] AIR BLEEDER VALVE FOR WATERBED MATTRESSES

[75] Inventors: Charles P. Hall, Muir Beach; John B. Johenning, Beverly Hills, both of Calif.

[73] Assignee: Monterey Manufacturing, Inc., Los Angeles, Calif.

[21] Appl. No.: 250,864

[22] Filed: Apr. 3, 1981

[51] Int. Cl.³ ............................................. B01D 19/00
[52] U.S. Cl. .......................................... 55/36; 55/159; 55/DIG. 43; 210/767; 210/136
[58] Field of Search ...................... 5/451, 452; 55/159, 55/385 C, 417, 498, 528, DIG. 43, 36; 210/767, 94, 120, 136, 446, 488, 497.01

[56] References Cited

U.S. PATENT DOCUMENTS

| | | | |
|---|---|---|---|
| 1,847,068 | 3/1932 | Campbell | 55/417 |
| 2,789,654 | 4/1957 | Zurit | 55/417 X |
| 3,463,132 | 8/1969 | Krieck | 55/498 X |
| 3,631,654 | 1/1972 | Riely et al. | 210/446 X |
| 3,765,536 | 10/1973 | Rosenberg | 210/446 |
| 3,765,537 | 10/1973 | Rosenberg | 210/446 |
| 4,077,784 | 3/1978 | Vayrynen | 55/417 X |
| 4,184,966 | 1/1980 | Pall | 55/498 X |

*Primary Examiner*—Robert H. Spitzer
*Attorney, Agent, or Firm*—Lyon & Lyon

[57] ABSTRACT

An air bleeder valve for a waterbed mattress comprises a hollow tubular body sized to fit snugly into the fill spout of a waterbed mattress, a flap valve at one end of the body, and a porous, non-water absorbing water barrier in the tubular body for preventing water from splashing out of the mattress when bleeding air from the mattress.

4 Claims, 3 Drawing Figures

AIR BLEEDER VALVE FOR WATERBED MATTRESSES

BACKGROUND

The present invention relates to waterbed mattresses, and in particular, air bleeder valves for waterbed mattresses.

A problem with waterbed mattresses is eliminating the bulk air present in the mattress after the mattress is filled with water. Air can make sleeping uncomfortable and can produce a loud slushing noise when the mattress is set in motion. Air is conventionally removed from the mattress by pushing on the top surface of the mattress by hand or with a broom stick to force the air into the vicinity of the fill valve of the mattress. Then the cap of the fill valve is removed and the air is forced out of the mattress into the atmosphere.

A problem with this method is that water is inevitably splashed onto the mattress. Another problem is that when the valve is opened, air from the atmosphere can bleed back into the mattress. In view of these problems, it is apparent that there is a need for an apparatus and method which makes it possible to easily bleed air out of a waterbed mattress.

SUMMARY

The present invention is directed to an air bleeder valve for a waterbed mattress which satisfies this need. The valve comprises an elongated, hollow tubular body, a check valve, and a water barrier. The tubular body has first and second ends and corresponding first and second end portions. At least the first end portion of the body is sized to fit snugly into the fill spout of a waterbed mattress.

The check valve, which is preferably a flap valve, is provided at the second end of the tubular body. The flap valve allows air to pass out of the body through the second end, but prevents air from passing into the body through the second end.

The water barrier serves to prevent water from splashing out of the mattress during the bleeding process. The water barrier comprises a non-water absorbing fibrous material so that the barrier does not act as a wick for water by capillary action. The barrier is sufficiently porous that even when wet, air can pass through the barrier.

Thus, the air bleeder valve of the present invention allows air to be bled from a waterbed mattress without splashing, and without atmospheric air bleeding back into the mattress.

DRAWINGS

Figure 2:
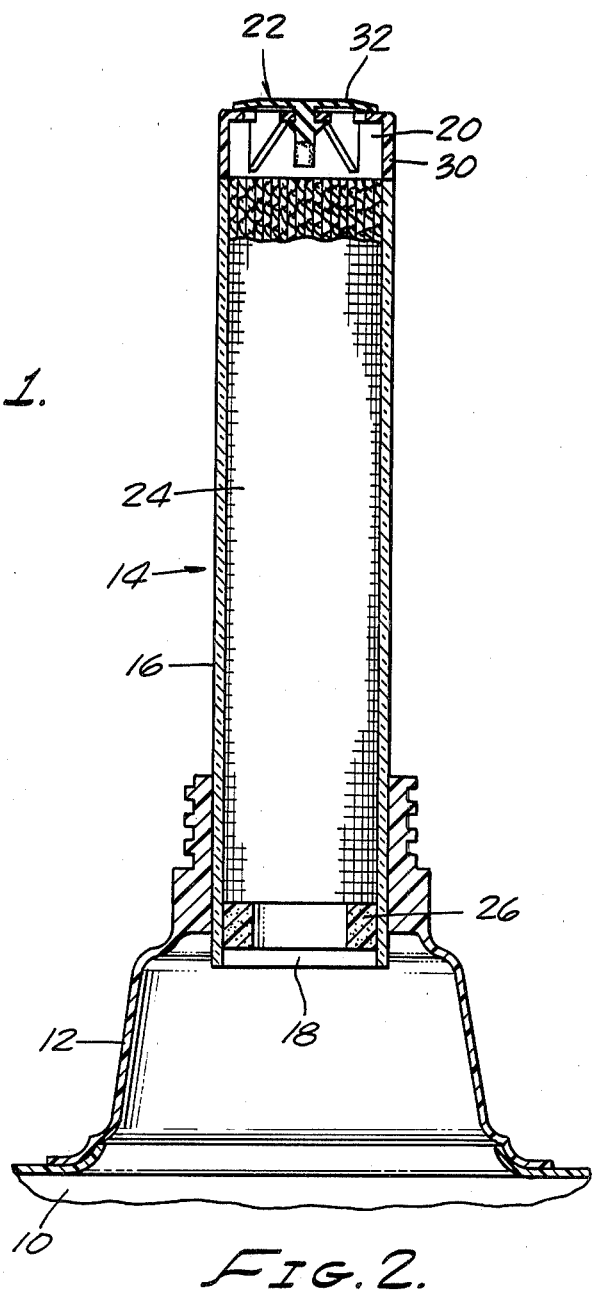
Figure 3:
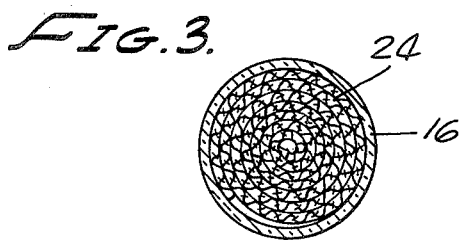

These and other features, aspects and advantages of the present invention can become better understood with reference to the following description, appended claims, and accompanying drawings where:

FIG. 1 is a perspective view of an air bleeder valve according to the present invention; and FIG. 2 is a sectional view of the air bleeder valve of FIG. 1 mounted in the fill spout of a waterbed mattress; and FIG. 3 is a sectional view of the air bleeder valve of FIG. 1 taken on line 3—3 in FIG. 1.

DESCRIPTION

With reference to FIG. 2, a waterbed mattress 10 is provided with a fill spout 12 which can be a conventional Roberts collapsing valve. An air bleeder valve 14 according to the present invention is provided to bleed air out of the mattress.

With reference to FIG. 1, the valve 14 comprises an elongated, hollow, tubular body 16. The body 16 has a first open end 18 which is to be inserted into the filler spout 12, and a second opposing end 20. On the second end 20 there is mounted a check valve, which is preferably a flap valve 22, but which can be a ball valve or the like. Within the hollow body there is provided a water barrier 24 that preferably extends substantially the entire length of the body portion 16. The water barrier is retained in the body portion by a gasket 26 which fits snugly into the body 16.

At least the portion of the body 16 adjacent the first end 18 is sized to fit snugly into the fill spout 12 so that when bleeding the mattress 10, water cannot leak around the bleeder valve 14. This snug fit can be obtained by placing an adapter in the fill spout, where the adapter is sized so that its outer wall fits snugly against the fill spout and its inner wall fits snugly against the outer wall of the bleeder valve 14.

Preferably the body 16 is made of a rigid transparent or translucent material. The transparency or translucency permits the user to see when the body 10 is full of water, thereby indicating that all of the air has been bled out of the mattress. A satisfactory material is acrylic resin.

The flap valve 22 is mounted to allow air to pass out of the body through the second end 20 and to prevent air from passing into the body through the second end. The valve 22 comprises two parts, a retainer body 30 that fits onto the second end 20 of the body 14 and a flap 32 held by the retainer. A preferred flap valve is available from Hydro Rubber of Torrance, California. The retainer 30 is available under Catalog No. 220-150 and the flap 32 is available under trade designation "JOB 19". The flap valve 22 can be secured to the tubular body 14 with a solvent cement.

The water or splash barrier 16 is sufficiently porous that even when wet, air can pass through it. It acts to prevent water from splashing out of the mattress when bleeding air from the mattress. It is constituted of a non-water absorbing material, where the barrier does not act as a wick for water. It has been determined that if the barrier does act as a wick for water, eventually water will splash out through the flap valve and air will be prevented from bleeding out of the mattress.

A preferred water barrier is formed of a low fiber density knitted mesh of polypropylene fiber such as eight mil polypropylene knitted into a coarse gauge jersey stitch. The stitched material is then cut to the desired length and rolled into tubular shapes to fit into the tubular body 14.

In one version of the present invention the body portion has an outer diameter of about 1.15 inches and an inner diameter of about 0.87 inch and is about 4.6 inches long. The water barrier is formed from a strip of fabric about 20 inches wide and about 4.4 inches long rolled up to form a tube about 4.4 inches long to fit into the tubular body. The fabric comprises eight mil polypropylene knitted on a coarse gauge jersey stitch.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for bleeding air from the waterbed mattress having a fill spout comprising the steps of:
   (a) selecting an air bleeder valve comprising:
      (i) an elongated, hollow tubular body having first and second ends and corresponding first and second end portions wherein at least the first end portion is adapted to snugly fit into the fill spout of a waterbed mattress;
      (ii) a porous water barrier in the tubular body for preventing water from splashing out of the mattress when bleeding air from the mattress, the water barrier being constituted of a non-water absorbing material, the barrier not acting as a wick for water and being sufficiently porous that when wet, air can pass through the barrier; and
      (iii) a check valve at the second end of the tubular body for allowing air to pass out of the body through the second end and for preventing air from passing into the body through the second end;
   (b) placing the bleeder valve into the fill spout so that at least the first end portion of the tubular body is snugly fit into the fill spout; and
   (c) subsequently causing air in the mattress to pass to the fill spout and out the bleeder valve, wherein water is prevented from splashing out of the mattress by the water barrier and air is prevented from passing from the atmosphere into the mattress by the valve.

2. The method of claim 1 in which the water barrier comprises knitted polypropylene fiber.

3. The method of claim 1 in which the check valve is a flap valve.

4. The method of claim 1 when the air bleeder valve includes an adapter for snugly fitting the first end of the tubular body into the fill spout.